United States Patent [19]

Pfuetze

[11] Patent Number: 5,275,568

[45] Date of Patent: Jan. 4, 1994

[54] GEOGRAPHIC LOCATOR SYSTEM

[76] Inventor: Dave Pfuetze, 101 RAinbow Dr., Livingston, Tex. 77351-9300

[21] Appl. No.: 913,621

[22] Filed: Jul. 16, 1992

[51] Int. Cl.$^5$ .............................................. G09B 29/10
[52] U.S. Cl. ................................ 434/153; 434/150; 283/35
[58] Field of Search ............... 434/153, 150, 146, 141, 434/135; 283/34, 35

[56] References Cited

U.S. PATENT DOCUMENTS

| | | | |
|---|---|---|---|
| 1,921,332 | 8/1933 | Sanwald | 283/35 |
| 3,383,651 | 5/1968 | Koblick | 340/6 |
| 3,653,031 | 3/1972 | Hlady et al. | 340/347 AD |
| 3,733,718 | 5/1973 | Hill et al. | 434/216 |
| 4,402,672 | 9/1983 | Lowe, Jr. | 434/217 |
| 4,443,198 | 4/1984 | Ehsanipour | 434/153 |

FOREIGN PATENT DOCUMENTS

| | | | |
|---|---|---|---|
| 0136351 | 1/1934 | Austria | 283/35 |
| 3915530 | 11/1990 | Fed. Rep. of Germany | 434/153 |

Primary Examiner—Gene Mancene
Assistant Examiner—Jeffrey A. Smith
Attorney, Agent, or Firm—Ogram & Teplitz

[57] ABSTRACT

A system for locating geographic points on maps, charts and, the like uses a rectangular grid with sides tangent to the corresponding geographical extremities of the area (city, county, state, nation, etc.) represented on the chart. Two decimal scales extend from the zero ordinate of the grid, with unit ordinates at their opposite ends. Thus, a location along either scale and therefore a line of position across the enclosed geographical area represented, may be defined by a decimal number between zero and one and the intersection of the lines of position representing a point on the represented area may be defined by a two decimal array. Tables of the decimal arrays for specific points may be provided, and the system is extendible to different maps and/or insets of dissimilar scale, so long as the, decimal scales are consistently used between each map. The system may be further extended to provide point location within three dimensional volumes by using a three decimal array. The advantages of the system are numerous, including ease of visualization and ease of reading maps and charts of all types in general; ease of teaching geography and related subjects; and wide spread applicability to other areas.

16 Claims, 2 Drawing Sheets

GEOGRAPHIC LOCATOR SYSTEM

FIELD OF THE INVENTION

This invention relates generally to geometric coordinate systems, and more specifically to a decimal coordinate system which may be applied to two or three dimensional spaces or representations thereof, particularly maps, charts and the like.

BACKGROUND OF THE INVENTION

The development of geodesy and cartography have led to the further development of various systems for defining the location of specific points on the surface of the earth or on a representative map or chart. Two primary principles of point location have been developed: The polar coordinate system (e.g., degrees of latitude and longitude) and the Cartesian coordinate system of ordinates about a set of orthogonal axes.

Of the two, the Cartesian coordinate system is preferred for use with flat surfaces such as conventional maps and charts. The problem with the polar coordinate system is that it is based upon an angular measurement; hence, absolute distances increase with the distance from the origin. The inherent problems associated with this system are apparent on larger scale maps and charts.

As a result, most makers of maps and charts for the layman nave used a Cartesian coordinate or "grid" system to specify locations on the map. The various systems developed are arbitrary at best, and provide no clear transfer from one map to specify another, particularly in the case of maps or charts made by different companies. The most commonly used system is an alphanumeric one, in which a series of numbers are used to define points along one axis and a series of alphabetical letters are used to define points along a second perpendicular axis. While this system is superior to the polar coordinate system for use with maps representing a relatively small area of the surface of the earth (e.g., a single state road map or the like), the alphanumeric notation used provides no rapid and clear concept of the location of a point on that map. A designation such as "M-13" is, of no value to a person, unless that person also knows the limits of the notation scales used. In the above example, an area within a grid column "M" may be on the centerline of the defined map, if the entire alphabet is used. On the other hand, if only the first half of the alphabet is used, then the area will lie somewhere very near one edge. In addition, such conventional systems describe only a general area, rather than pinpointing a specific location as in the case of the present invention. Thus, a user of such a conventional system would be forced to search a relatively large rectangular area of a map in order to find a point identified as being located in (for example) area "M-13." In fact, it is likely that a plurality of point" of interest will be located in such a single rectangular area, with each point of interest having the same general location description even though they may be widely separated. This can lead to less than optimum choices in routes and other logistic decisions if planning is based upon a callout for a single general area containing several widely spaced points.

Such alphanumeric systems are limited in another respect, and that is that at least along the axis using letters of the alphabet, no more resolution than that provided by the 26 characters of the alphabet may be provided. If resolution to 100 units is desired, some additional system must be added. Other deficiencies are apparent with these commonly used reference systems, which render such systems cumbersome and confusing to the user.

The need arises for a coordinate system for use with maps, charts and the like, which system is easily understandable by the user and which is easily transferable between various maps and scales. The system must also easily accommodate the location of points in a three dimensional volume. Due to the ease of use of such a system, the teaching of the system to others and visualization of locations would also be readily achieved.

DESCRIPTION OF THE RELATED ART

U.S. Pat. No. 3,383,651 issued to S. N. Koblick on May 14, 1968 discloses a Plane Coordinate Computing System for determining the location of ships. The system is primarily directed to the electronic apparatus used in the system.

U.S. Pat. No. 3,653,031 issued to A. M. Hlady et al. on Mar. 28, 1972 discloses a Touch-Sensitive Position Encoder related to "touch screen" type operations with computer monitors.

U.S. Pat. No. 4,402,672 issued to H. E. Lowe, Jr. on Sep. 6, 1983 discloses a Method For Plotting And Disseminating Information On The Path Of Violent Storms. The method includes various alphanumeric grid overlays for maps of areas in which violent storms may be encountered. The grids are not orthogonal, but rather one set of grid lines is diagonal on the maps. The same grid designations are used for different map scales, meaning that a map of a county within a state will have a different designation than would the same area on the state map. No means of refining the system for smaller areas is disclosed, other than the provision of another like grid for the smaller area as noted above.

Finally, U.S. Pat. No. 4,443,198 issued to K. Ehsanipour on Apr. 17, 1984 discloses a Folding Board For Pamphlets, Maps And The Like. The patent discloses a multiply hinged board which may be unfolded to support a map or chart.

None of the above noted patents, either singly or in combination, are seen to disclose the specific arrangement of concepts disclosed by the present invention.

SUMMARY OF THE INVENTION

By the present invention, an improved system for the determination and location of geographic points is disclosed.

Accordingly, one of the objects of the present invention is to provide an improved geographic locator system operable with various two dimensional maps, charts and the like.

Another of the objects of the present invention is to provide an improved geographic locator system which is easily transferable to use in describing locations in a three dimensional volume or space.

Still another of the objects of the present invention is to provide an improved geographic locator system which may be applied to maps, charts and the like of any size, scale, or area, and thus may be made to provide any degree of accuracy desired.

Yet another of the objects of the present invention is to provide an improved geographic locator system which permits easy visualization of a specified location without the use of a map for a user of the system who is generally familiar with the geography represented.

A further object of the present invention is to provide an improved geographic locator system which simplifies the teaching of geography and the location of various features.

An additional object of the present invention is to provide an improved geographic locator system which is consistent between larger scale maps and smaller scale insets, thus eliminating the need to provide different reference grids for the two.

Another object of the present invention is to provide an improved geographic locator system which provides for ease of computation between different maps of similar or varying scales and using the same system.

Another object of the present invention is to provide an improved geographic locator system which may utilize a single separate table of locator points, the table valid for any scale maps of the given area; thus, a callout for a given location is constant, regardless of the physical size of the map of the given area.

Another object of the present invention is to provide an improved geographic locator system which is readily adaptable to ,1 use in tracking and delivering parcels, mail and the like in a given geographic area.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

Similar reference characters designate corresponding parts throughout the several figures of the drawings.

DESCRIPTION OF THE PREFERRED EMBODIMENTS

Figure 1:
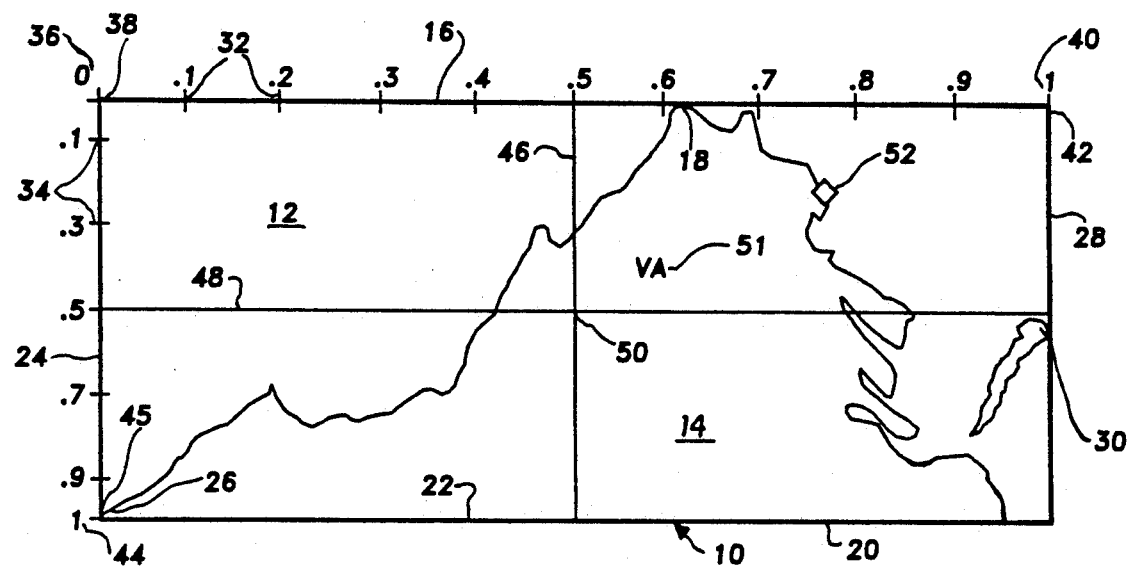
FIG. 1 is a basic map of the state of Virginia with an overlay of the geographic locator grid of the present invention.

Referring now to the drawings, particularly FIG. 1 of the drawings, the present invention will be seen to relate Lo a decimal system providing a means for easily locating geographical points on a surface or within a volume, or on a representative map or chart thereof. The system comprises a rectangular grid or ordinate matrix 10, which grid 10 is superimposed over a map or chart 12 of the subject geographical area 14. Grid 10 is formed by providing a first boundary 16 tangent to a first extremity or limit 18 of the border of the subject area 14 as represented on chart 12, and a second boundary 20 tangent to an opposite second border extremity 22 with the second boundary 20 parallel to the first boundary 16. A third boundary 24 is then provided extending between the first boundary 16 and the second boundary 20 and perpendicular to both, and tangent to a third extremity or limit 26 of the represented area 14 of chart 12, with a fourth boundary 28 tangent to a fourth border extremity or limit 30 of the defined area 14 of chart 12 and parallel to the third boundary 24 and perpendicular to both the first and second boundaries 16 and 20.

Typically, maps or charts such as map 12 of an area 14 are laid out with the uppermost edge corresponding to the northernmost portion of the area represented, and the lower edge corresponding to the southernmost portion of the geographical area. The leftmost and rightmost edges of map or chart 12 respectively correspond to the westernmost and easternmost portions of the depicted area. Moreover, the uppermost and lowermost edges are generally horizontal, while the leftmost and rightmost edges are generally vertical. This convention has been used in FIG. 1; however, it will be seen that the above discussion is not necessarily limited to such a convention, so long as the area depicted is contained within a rectangular grid which grid boundaries are tangent to the extremities of the depicted area.

Points or locations within grid 10 are defined by a first boundary scale 32 and a second boundary scale 34. First boundary scale 32 extends from a zero ordinate 36 at a first end 38 of first boundary 16 (which point 38 also defines a first end for third boundary 24), to a unit ordinate 40 at a second end 42 of first boundary 16. Second boundary scale 34 is laid out in a similar manner along the third boundary 24, extending from zero ordinate 36 at first end 38, to a unit ordinate 44 at the second end 45 of third boundary 24. Obviously, scales 32 and 34 may be placed along the second and fourth boundaries 20 and 28 if desired. However, writing convention in the non-Asian world starts with the upper left corner of a sheet, thence proceeding across the top of the sheet and then to subsequent lower lines. The present invention takes advantage of this convention by providing a first scale 32 along first boundary 16, and a second perpendicular scale 34 along (in this particular case) the leftmost or third boundary 24. Thus, zero ordinate 36 is common to both scales 32 and 34, and is positioned at the upper left corner of the chart 12, defined by point 38.

As scales 32 and 34 are each limited by a common zero ordinate 36 and unit ordinates 40 and 44, it will be seen that any point between the ends of either scale may be defined by a decimal number. Such a decimal numbered point on a given scale may be used to project a line perpendicular to the scale and across the chart 12 to the opposite boundary. Two lines respectively projected from scales 32 and 34 will be seen to define a point somewhere within the boundaries of chart 12, thus pinpointing a location on the chart 12. The callout for such a point is described by first citing the decimal number from the first scale 32, followed by the decimal number from the second scale 34. Such a callout will take the form of .X.Y, where .X is a decimal number along the first scale 32 and .Y is a decimal number along the second scale 34.

An example is shown in FIG. 1 by the intersecting grid lines 46 and 48. First grid line 46 extends perpendicularly from the 0.5 point of the first scale 32, while second grid line 48 extends perpendicularly from the 0.5 point of the second scale 34. The intersection of grid lines 46 and 48 defines a point 50 at the geographic center of map or chart 12 (although not necessarily at the geographic center of the geographic area 14 depicted thereon), and is described as "0.5.5". Of course, other grid lines may be included over the surface of chart 12 and/or the representation of geographical area 14 as desired; these are not shown in the drawing figures in the interest of clarity in the various views.

Figure 2:
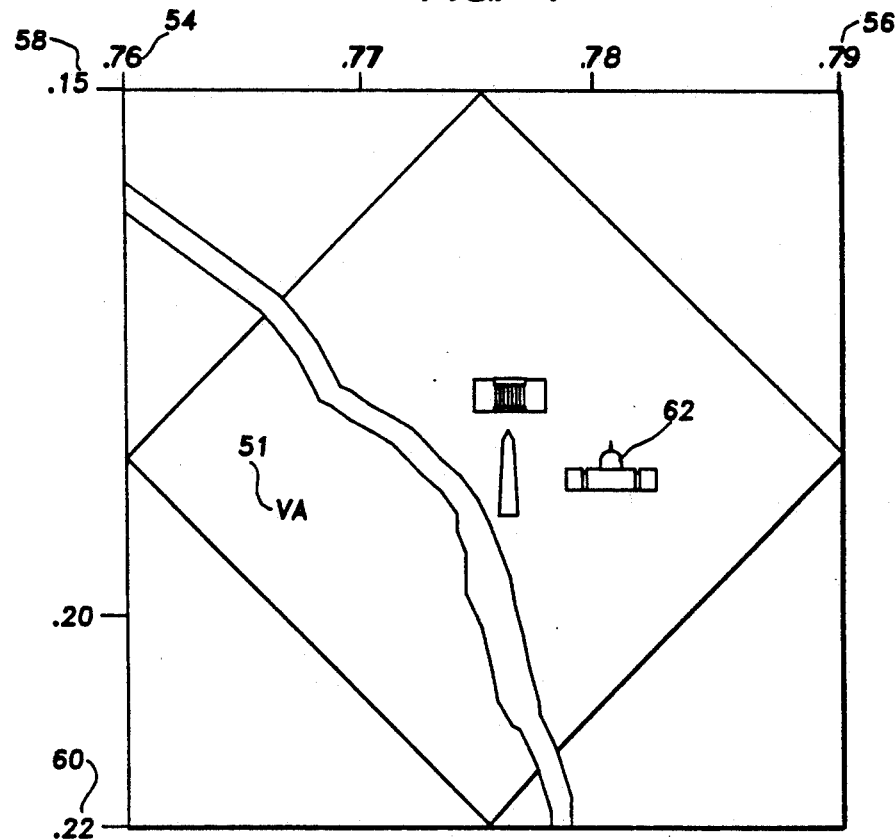
FIG. 2 is a basic map of Washington, DC and Arlington County, Va. showing the transferal of the system of FIG. 1 to a different map and scale.

It will be understood that, while the decimal grid system of the present invention may be used universally on any map, chart or representation of a geographical or other area, it is essential that some identification of the map or chart be provided in order that the proper geographical location be pinpointed. Thus, a map or chart identifier 51, in this case "VA" to identify a map of Virginia, is provided in FIGS. 1 and 2. As the map of FIG. 2 is included in the area shown in the master map 12 of FIG. 1 and the decimal grid provided for the maps of both figures is consistent between the two, the same callout 51 is used to identify both maps. Thus, to identify a specific geographical point using the system of the present invention, three steps are involved: (1) The appropriate map or chart must be determined, (2) the decimal grid number along the horizontal scale must be determined to define a line across the given map or chart, and (3) the decimal grid number along the vertical scale must be determined to define a point on the vertical line defined by the horizontal grid decimal number.

In the event that a grid is not provided on the map or chart in question, the determination of grid decimal numbers is a fairly straightforward arithmetical procedure requiring only a ruler or scale in addition to the map. First, the total width of the geographical entity covered by the map (excluding margins and the like) is measured. Next, the span or distance from the left border to the first or leftmost edge of the location of interest is measured. By comparing the ratio of the measured distance from the first edge to the specific location, and the measured distance from the first edge to the opposite edge of the map, a decimal fraction may be determined. A similar operation is used for determining the decimal number relative to the second axis of the system.

An example of the above might provide a measurement between the opposite extremities of the subject area of 31.75 inches and a measurement of 24.25 inches from the left border to the location of interest. Dividing 24.25 by 31.75 results in a decimal fraction of 0.76 (to two places). In a similar manner, a measurement across the second axis might provide a dimension of 14 inches, with a measurement of 2.12 inches to the first ed the location of interest on the map. 2.12 divided by 14 results in a decimal fraction of 0.15 (again, to two places). These decimal fractions, 0.76 and 0.15, may be used to determine the location of a specific point on the subject map, as will be discussed further below.

In the example provided in FIG. 1, point 50 will be seen to lie near the northwest edge of the state of Virginia, depicted as geographical area 14 and having a map designation 51 of "VA." Any other point may be designated in a similar manner. Another example might be a point designated as "VA.76.15", as calculated above using a map of Virginia. As can be seen, any number of digits may be used following either decimal point in order to more precisely define the exact location of a given point as desired. In this case, the first number, 0.76, will be seen to define a line slightly more than three quarters of the distance between the westernmost and easternmost extremities 26 and 30 of the state, as shown in FIG. 1. The second decimal number (0.15) will be seen to define a line slightly more than one seventh of the distance down from the uppermost limit 18 of the state. These lines are not depicted in FIG. 1, in order to show the ease of visualization of the location defined by the two decimal numbers provided. No matter what the state or other geographical area represented, a user of the present system will readily observe that a point designated as "0.76.15" will lie somewhere toward the northeast corner of the depicted area. In the specific case shown in FIG. 1, it will be readily observed that this designation describes the approximate location of the northwest boundary of Washington, DC and Arlington County, Virginia, designated as 52 in FIG. 1.

FIG. 2 provides a detail of the area 52 generally described immediately above. Such details are often included as insets in unused areas of maps or charts, particularly in the case of depicted geographical areas which have irregular borders. Obviously, this could have been done by combining FIGS. 1 and 2 of the drawing figures; however, the figures are shown separated for clarity. Often, there is no correlation between the system used for the larger scale map, and that used for the smaller scale inset. The resulting difficulty and confusion from attempting to use two dissimilar scales can lead to significant errors in interpretation of such maps. The present invention eliminates such confusion by utilizing a consistent set of scales and nomenclature for all areas depicted upon a chart.

As noted above, the designation "VA.76.15" describes the approximate location of the northwest edge of the Washington, DC area 52 relative to the state of Virginia on the chart 12 of FIG. 1. FIG. 2 shows the Washington, DC and Arlington County, Va. areas as extending from approximately 0.76 to 0.79 from west to east, as respectively indicated by scale callouts 54 and 56, and from approximately 0.15 to 0.22 from north to south, respectively indicated by scale callouts 58 and 60, relative to the decimal system depicted in FIG. 1. Thus, not only may the same system be used for locating general features on larger scale maps, but also for locating more specific points on smaller scale charts and maps, merely by further defining the points by means of additional digits.

Preferably when using the system of the present invention, the grid callouts (such as "VA.76.15" described above) used to describe the location of a point are chosen to pinpoint the upper left edge of the described location. With this convention, the user of the system of the present invention will know that if the specific location does not correspond directly with the grid callouts, then the location will be to the right and/or downward from the location pinpointed by the callouts. This simplifies the use of the present system, in that it is not necessary to search completely around the area of the callout location to find the location on the map.

A related point which must be emphasized in the discussion of the present invention is that any decimal callout describes a specific corresponding geographical point, rather than an area as is the case with other systems. A discussion of this point was provided in the Background of the Invention above. Other systems generally merely designate a rectangular area on a map or chart, leaving a search throughout the designated area as an exercise for the user. By contrast, the present invention always designates a specific point. Even in the "0.5.5" example cited above to pinpoint the location of the center of map 12, the "0.5.5" callout does not describe an area on the map, but rather a specific point defined by the intersection of grid lines 46 and 48. Further, it will be understood that any degree of accuracy may be achieved using the system of the present invention, as will be discussed further below.

FIG. 2 also depicts various well known landmarks in the Washington, DC area. A great number of visitors to the Washington, DC area are interested in seeing or visiting these landmarks, and maps using the system of the present invention would be of great assistance to anyone wishing to determine the location of such landmarks. As these points are even more specific than the general Washington, DC area, further definition is provided by means of three places to the right of each decimal point for the callouts. Thus, a person wishing to see the Capitol, indicated as 62 in FIG. 2, could check the appropriate row 64 of the table 66 of FIG. 3 to find that the Capitol is located at VA.779.185 relative to the maps or charts of either FIG. 1 or 2.

Obviously, the three digit resolution provided by table 66 is of no use in finding the location of features on the larger scale map of Virginia of FIG. 1. However, the first or the first and second digits to the right of the decimals could still be used to determine a point near the general area of the specific landmarks, while the higher resolution provided by the three digits may be used to determine the precise location of such landmarks on the smaller chart. Of course, further definition may be provided as needed merely be adding the appropriate digits to each portion of the callouts. Conversely, table 66 may provide grid callouts using only one digit to the right of each decimal, for more general features such as large cities, state and national parks, etc. However, it is important to note that the system of the present invention does not involve the "rounding" of any numbers. Such rounding would render the system inaccurate at best. It is understood that resolution to three or more places provides no practical use on a base map such as map 12 of FIG. 1. Nevertheless, any grid callout provides a description of a specific point, and thus is not rounded to reduce accuracy. However, in many cases only a single digit for each grid number is needed, as discussed above.

The examples described above show the map of FIG. 2 to be a larger scale of a portion of the map 12 of FIG. 1, and accordingly to use corresponding decimal grid callouts. Obviously, however, the map of FIG. 2 could stand on its own, with zero and unit ordinates as in the case of the map 12 of FIG. 1. In any case, the system of the present invention provides for a "primary map" such as the map or chart 12 of FIG. 1, to be marked with decimal grid scales between zero and one. Other related maps may be based upon the primary map, or may stand on their own and have their own separate table.

Figures 3, 4:
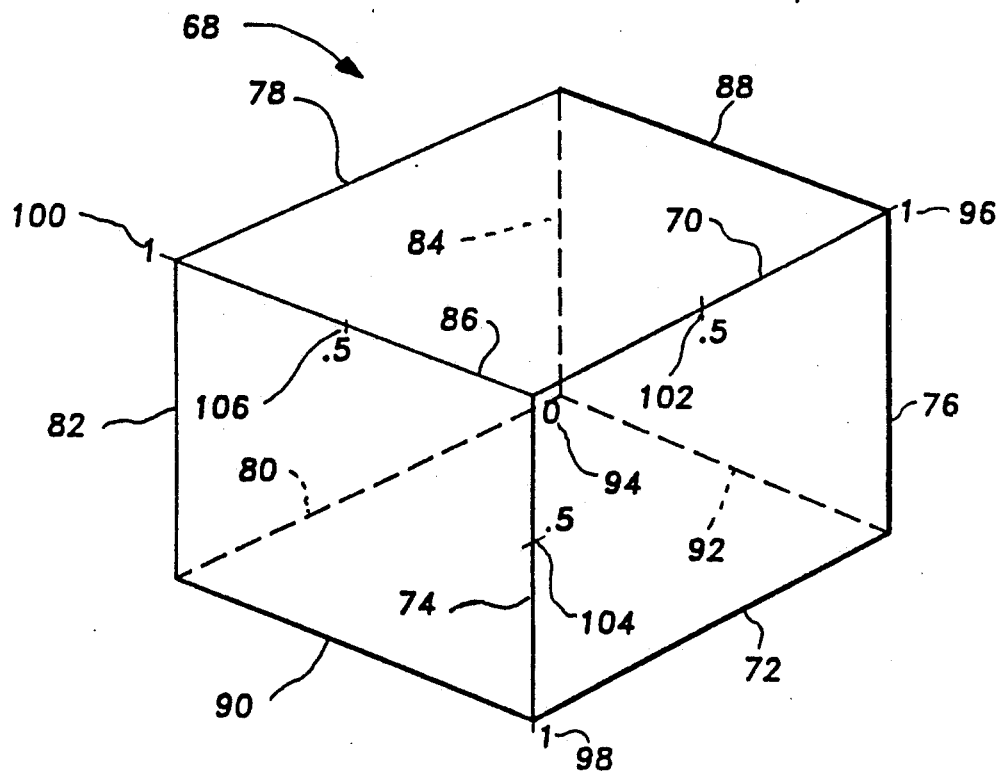
FIG. 3 is a table showing the geographic locations of various points represented in FIG. 2, using the geographic locator system of the present invention.
FIG. 4 is a perspective view of a three dimensional volume showing the use of the system of the present invention to describe the location of points therein.

FIG. 4 shows a further embodiment of the above described invention to include point location for three dimensional spaces or volumes. FIG. 4 depicts a rectangular solid or volume 68 defined by first and opposite parallel second edges 70 and 72; perpendicular third and fourth edges 74 and 76; corresponding fifth, sixth, seventh, and eighth edges 78, 80, 82 and 84; and ninth, tenth, eleventh and twelfth edges 86, 88, 90 and 92 serving to join the first through fourth edges with the fifth through eighth edges to define the rectangular volume 68 of FIG. 4. A zero ordinate 94 is established at the intersection 96 of mutually orthogonal first, third, and ninth edges 70, 74, and 86, with unit ordinates 96, 98 and 100 respectively established at the opposite ends of edges 70, 74 and 86. Thus, three points such as 102, 104 and 106 established respectively along edges 70, 74 and 86 may define mutually orthogonal planes across rectangular volume 68, and may be used to locate a specific point at the intersection of the three planes within a rectangular solid or volume 68, by means of a three decimal callout such as "0.5.5.5" (in this case, the geographical center of volume 68) in much the same manner as the two decimal callouts described to pinpoint a location on the maps of FIGS. 1 and 2. Tables similar to the table 66 of FIG. 3 could be established for such a volume, but providing three decimal callouts rather than the two required for two dimensional surface. Such a system would be most useful for specifying the spatial location of celestial objects; crates or other objects stored in a warehouse; office suites or apartments in a building; and mineral deposits below the surface of the earth, as well as other applications.

A multitude of advantages are provided by the embodiments of the above locating system. The universal application of the system enables it to be used with virtually any maps, charts or representations of an area or space. The system is adaptable to any size of map, chart or representation, as evidenced by the examples shown in FIGS. 1 and 2 above, without need to modify the specific callouts for a given point or points. The decimal nature of the system provides for ease of visualization of a general location even if the user does not have a map of the area, as indicated in the example of the Washington DC area of FIG. 1. The present system would therefore be extremely useful to writers in order to more accurately describe to the reader, the location of a given point or area relative to another. Greater precision is easily attainable by merely adding places to the decimal callouts to provide greater accuracy; this may easily be done by slight modifications to a separate table provided rather than altering the map itself.

Moreover, such a system enables points on the same map or different maps to be readily compared, by means of calculations according to the Pythagorean theorem. Such a procedure is generally well known, as evidenced by U.S. Pat. No. 3,383,651 cited under the prior art discussion above; however, the adaptation of that principle to the present invention offers advantages in the calculation of position and location on maps which were heretofore not easily attainable. The decimal grid system of the present invention inherently provides the raw numerical data for such calculations, without need for the additional step of calculating numbers based upon an alphanumeric system.

In a similar manner, allowance may be made for the errors inherent in plotting a representation of a spherical surface to a flat surface by means of spherical geometry techniques. Generally, projection techniques such as the Mercator or Lambert Conformal Conic systems are used. The present invention may be readily adapted to such projections (and obviously, other projection systems also) using known techniques.

The system of the present invention would also serve to locate specific points and locations for use with package or mail delivery systems. The present ZIP code system used in U.S. mail delivery, for example, provides only a general concept of the easterly or westerly location of an area; further refinement is, dependent upon the user's specific knowledge of the system. The system of the present invention, however, is readily usable by anyone familiar with the decimal system.

Thus, a universal system enabling a user to readily visualize or locate a point on a map, chart or representation of a two or three dimensional area or space is provided. The numerous advantages of the present system over the prior art are evident, as indicated above.

It is to be understood that the present invention is not limited to the sole embodiments described above, but encompasses any and all embodiments within the scope of the following claims.

I claim:

1. A system providing for the determination of geographic points on maps, charts and other representations of geographic areas, with the geographic areas defined by borders having extremities therealong, said system comprising:

a rectangular grid formed or orthogonal first, second, third and fourth boundaries about a representations of a geographical area, said first, second, third and fourth boundaries each tangent to a corresponding point on an extremity of the border of the represented geographical area, said first, second, third and fourth boundaries having intersections further defining first, second, third and fourth corners of said rectangulars grid, said rectangular grid further including a zero ordinate at one of said corners and unit ordinates at each of said corners orthogonal to said zero ordinate with said boundaries between said zero ordinate and said unit ordinates providing orthogonal decimal boundary scales between the ranges of zero and one, with said decimal boundary scales thereby serving to divide the geographical area fractionally, whereby locations of points on said geographical area representation are provided by means of said decimal boundary scales of said rectangular grid with each said decimal boundary scale providing a series of decimal fractional numbers representing perpendicular lines of location across the geographical area representation and the intersections of the perpendicular lines of location establishing said locations of said points and any one of said points is represented by an array of two decimal fractions; and, wherein at least two geographical representations of dissimilar scale are provided with said system providing like ordinates for like points within each representation.

2. The system of claim 1 including:

at least one grid line extending perpendicularly from each of said decimal boundary scales and across said rectangular grid.

3. The system of claim 1 including;

a table listing and series of decimal fractional numbers for corresponding specific points with each of said decimal fractional numbers of said table arranged in a double decimal array for each of the corresponding specific points.

4. The system of claim 1 including:

a table listing said series of decimal fractional numbers for corresponding specific points with each of said decimal fractional numbers of said table arranged in a double decimal array for each of the corresponding specific points.

5. A system providing for the determination of points within a three dimensional rectangular volume, said system comprising;

a grid bounded by first through twelfth edges of a rectangular volume and defining edges and corners of the volume, said grid further including a zero ordinate at one of said corners and unit ordinates at each of said corners orthogonal to said zero ordinate with said edges between said zero ordinate and said unit ordinate providing first, second and third orthogonal decimal boundary scales between the ranges of zero and one and corresponding to the three dimensions of the three dimensional rectangular volume, whereby locations of points within a representation of a rectangular volume are provided by means of said decimal boundary scales of said grid with each said decimal boundary scale providing a series of decimal fractional numbers representing perpendicular planes of location across the rectangular volume representation and the intersections of the perpendicular planes of location establishing said locations of said points; and, wherein at least two volumes having dissimilar scales are provided with said system providing like ordinates for like points within each volume.

6. The system of claim 5 including:

at least one grid plane extending perpendicularly from each of said decimal boundary scales and across said grid.

7. The system of claim 5 including;

a table listing said series of decimal fractional numbers for corresponding specific locations with each of said decimal fractional numbers of said table arranged in a triple decimal array for each of the corresponding specific locations.

8. The system of claim 5 including:

a table listing said series of decimal fractional numbers or corresponding specific points with each of said decimal fractional numbers of said table arranged in a triple decimal array for each of the corresponding specific points.

9. A method for determining geographic points on maps, charts and other representations of geographic areas, with the geographic areas defined by borders having extremities therealong, said method comprising:

providing a rectangular grid formed of orthogonal first, second, third and fourth boundaries about a representation of a geographical area with said first, second, third and fourth boundaries each tangent to a corresponding point on an extremity of the border of the represented geographical area and said first, second, third and fourth corners of said rectangular grid, further providing a zero ordinate at one of said corners and unit ordinates at each of said corners orthogonal to said zero ordinate with said boundaries between said zero ordinate and said unit ordinates providing first and second orthogonal decimal boundary scales between the ranges of zero and one, determining first and second decimal fractional numbers respectively corresponding to positions along said first and second decimal boundary scales plotting first and second lines of location respectively from said positions along said first and second decimal boundary scales respectively corresponding to said first and second decimal fractional numbers, locating the point established by the intersection of said first and second lines of location, and, providing at least two geographical representations of dissimilar scale, and providing like ordinates for like points within each representation.

10. The method of claim 9 further including;
providing at least one grid line extending perpendicularly from each of said decimal fractional boundary scales and across said rectangular grid.

11. The method of claim 9 further including;
providing a table listing a series of said decimal fractional numbers for corresponding specific points with each of said decimal fractional numbers of said table arranged in a double decimal array for each of the corresponding specific points.

12. The method of claim 9 further including;
providing a table listing a series of said decimal fractional numbers for corresponding specific points with each of said decimal fractional numbers of said table arranged in a double decimal array for each of the corresponding specific points.

13. A method providing for the determination of points within a three dimensional rectangular volume, said method comprising;
providing an orthogonal grid bounded by first through twelfth edges of a rectangular volume with said grid defining edges and corners of the rectangular volume,
further providing a zero ordinate at one of said corners and unit ordinates at each of said corners orthogonal to said zero ordinate with said edges between said zero ordinate and said unit ordinates providing first, second and third orthogonal decimal boundary scales between the ranges of zero and one and corresponding to the three dimensions of the three dimensional rectangular volume,
determining first, second and third decimal fractional numbers respectively corresponding to positions along said first, second and third orthogonal decimal boundary scales,
plotting first, second and third planes of location respectively from said positions along said first, second and third orthogonal decimal boundary scales respectively corresponding to said first, second and third decimal fractional numbers,
locating the point established by the intersection of said first, second and third planes of location, and,
providing at least two volumes having dissimilar scales, and providing like ordinates for like points within each volume.

14. The method of claim 13 further including;
providing at least one grid plane extending perpendicularly from each of said first, second and third orthogonal decimal boundary scales and across said first, second and third orthogonal decimal boundary scales.

15. The method of claim 13 further including;
providing a table listing a series of said decimal fractional numbers for corresponding specific points with each of said decimal fraction numbers of said table arranged in a triple decimal array for each of the corresponding specific points.

16. The method of claim 13 further including;
providing a table listing a series of said decimal fractional numbers for corresponding specific points with each of said decimal fractional numbers of said table arranged in a triple decimal array for each of the corresponding specific points.

* * * * *